June 17, 1958  E. PLUMAT  2,838,881
APPARATUS FOR THE MANUFACTURE OF GLASS BEADS
Filed July 16, 1954
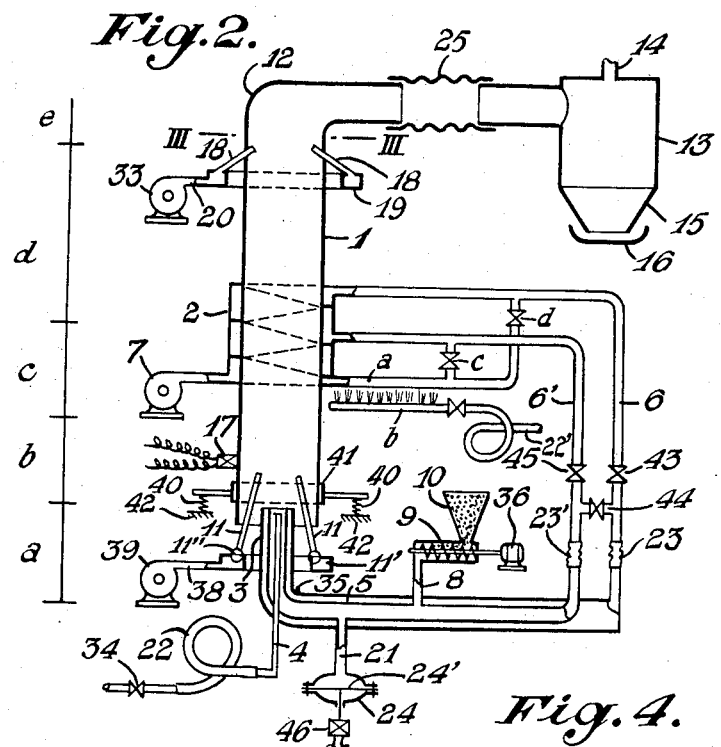
INVENTOR
Emile Plumat
By George H. Ladrey
ATTORNEY United States Patent Office 2,838,881
Patented June 17, 1958

2,838,881
APPARATUS FOR THE MANUFACTURE OF GLASS BEADS

Emile Plumat, Gilly, Belgium, assignor to Union des Verreries Mecaniques Belges Societe Anonyme, Charleroi, Belgium, a Belgian company Application July 16, 1954, Serial No. 443,936

Claims priority, application Belgium July 18, 1953

7 Claims. (Cl. 49—58)

The present invention relates to an apparatus for the manufacture of small solid balls (beads) which are generally used in the construction of beaded reflecting systems (cinema screens, road traffic signalling plates and strips, advertising panels etc.), and hereinafter referred to as "beads."

These small balls, the diameter of which is generally a fraction of a millimetre, are manufactured by means of glass chips of various compositions which are finely crushed beforehand.

It is known to manufacture beads by injecting a pre-heated mixture of glass granules, a fluid which supports combustion and/or a combustible fluid into a flame which is fed by the two fluids, in which flame the said granules are converted by melting and surface tension into beads which are then cooled and separated from the vehicle gases.

It is also known to manufacture beads by injecting the glass granules with the fluid supporting combustion and/or with the combustible fluid through a burner directed upwardly in the lower end of a substantially vertical tubular column, while imparting to the vehicle gases a velocity which is sufficient in order to entrain the glass granules, and the beads which are formed therefrom, towards the upper part of the tubular column, and at the same time to subject a section of the column to a cooling action which is designed to cool the beads, which are then separated from the vehicle gases in a separator provided in the upper part of the column.

The known processes and apparatus generally do not permit of obtaining a uniform product, because the process of pre-heating, suspending and melting the granules in the flame, and also the process of cooling the beads which are formed, are too imperfect, so that, on the one hand, a high proportion of the glass granules avoids the melting and is found in the finished product in angular form or more or less ovoidal form and that, on the other hand, a high proportion of beads is obtained in a form in which the beads are joined together and cannot be used.

According to the present invention these disadvantages are obviated by converting the glass granules into beads by means of a thermal treatment, the main characteristics of which may be summarised as follows:

The pre-heating of the glass granules is carried out with great rapidity up to a temperature slightly or immediately below the softening temperature of the glass, by dispersing the granules in at least one of the aforementioned fluids, previously pre-heated to a temperature slightly above the said softening temperature, and the beads, as soon as they are formed by the rapid melting of the granules thus pre-heated and injected into the flame, are then solidified suddenly, reducing to the utmost minimum the time during which the beads are liable to stick to one another, while after they have solidified, the said beads are cooled at a much slower speed, limiting the hardening and the internal tensions which result therefrom.

The glass granules are advantageuosly pre-heated rapidly, first of all up to a temperature slightly or immediately below their softening temperature and then up to the softening temperature by their introduction into, and during their entrainment by one of the two initially pre-heated fluids feeding a flame which is preferably directed upwardly; they are then injected in this pre-heated condition with the said fluid or fluids into the said flame and are brought by the latter rapidly to a temperature higher than their softening temperature; and the beads thus formed are subjected to a cooling process, advantageously in three stages, the first of which is sudden and terminates at the upper point of structural transformation, the second is moderate and terminates at the lower point of structural transformation and the third is sudden and terminates at a temperature slightly higher than 100°, after this, the beads are separated from the vehicle gases and are collected in a possibly graded condition by a centrifuging operation, according to their order of size. The flame is formed within an orientatable rising air current, the speed and temperature of which are adjustable.

The gas current charged with the shaped beads is caused to pass through a cooling zone of increasing intensity.

The process according to the invention is effectively carried out in an apparatus comprising a substantially vertical tubular column, the lower end of which has opening thereinto an upwardly directed burner which is supplied with fuel, a supporter of combustion and glass granules, while the upper end of the said column adjoins a centrifugal separator, the said apparatus being characterised in that at least one of the parts of the burner fed with a supporter of combustion and/or with fuel is connected to the source of the fluids in question by means of a pre-heating jacket surrounding at least one refrigeration zone of the column and to the said jacket by at least one pipe, into which opens the means for feeding glass granules.

The details of the features of the invention as set out above, and also the reasons for these features, as well as other features of the invention, both from the point of view of the process and from the point of view of the apparatus used for carrying it into effect, will be apparent from the following description and the accompanying drawing wherein:

Figure 1 shows a diagram representing the course of the thermal treatment applied according to the invention to the glass granules and to the resultant beads as a function of changes of the physical state experienced by the granules and the beads during the treatment.

Figures 2, 3 and 4 represent preferred embodiments of the apparatus for carrying into effect the process according to the invention, viz:

Figure 2 is a diagrammatic elevation of the complete apparatus, partly in section.

Figure 3 is a section of the line III—III of Figure 2, and

Figure 4 is a diagrammatic vertical section of one modification of the separator.

It will be understood from what has been stated above that, according to the invention, the glass granules are advantageously subjected to a thermal treatment consisting essentially of five characteristic stages, as indicated by the diagram according to Figure 1, these stages being:

Phase a.—Rapid pre-heating phase in two consecutive steps, the first terminating at a temperature slightly lower than $Tr$, the latter being the softening temperature of the treated glass, while the second step terminates at the temperature $Tr$.

Phase b.—Phase of moving in the flame: sudden heating up to a temperature $Tb$ higher than $Tr$.

Phase c.—Abrupt cooling down to a temperature in the region of $T\beta$, this being the upper point of structural transformation, that is to say, the point above which the internal tensions cannot be set up.

*Phase d.*—Moderate cooling phase between the temperatures $T\beta$ and $T\alpha$, the latter being the lower point of structural transformation, that is to say, the points below which the internal stresses can no longer be established.

*Phase e.*—Sudden cooling phase down to the outlet temperature $Ts$ of the vertical column forming part of the apparatus for carrying the present process into effect. At the end of this phase, the natural cooling is produced during evacuation, the temperature of the vehicle gases at the instant of their separation from the beads preferably being slightly higher than 100° C., in order to avoid the condensation of the water vapour on the beads.

According to the invention, the phase "*a*" is carried out by introducing the glass granules, preferably into the previously heated air for combustion.

This pre-heating is carried out by causing the air for combustion to circulate in cooling jackets which enclose the upper part of the apparatus.

It is obviously possible to obtain the same result with the combustible gas.

As it is necessary to bring the glass granules to a temperature in the region of $Tr$, it has been found that it is important to prevent them from sticking to one another. According to the invention, the procedure is as follows: the air is pre-heated to a temperature slightly higher than $Tr$. The granules are introduced into this air before it enters the burner. They are thus suddenly heated and are brought to a temperature which is the resultant of that of the air and of their actual temperature, that is to say, they are brought rapidly to a temperature slightly below $Tr$. The advantage of this process resides in the fact that by means of a regulation of the air temperature, the granules reach the temperature $Tr$ just at the instant when they penetrate into the flame. The dangers of the granules sticking to one another are thus reduced to the absolute minimum, in view of the fact that in practice they only reach a dangerous temperature at the instant of penetrating into the flame.

This process also avoids possibly of the granules agglomerating on the walls of the apparatus, as would be the case if they were placed in suspension in the air during the heating of the latter.

Having been pre-heated, the glass granules penetrate into the flame. The phase "*b*" is then carried out, during which the granules are instantaneously melted, owing to their having been pre-heated, by being brought to a temperature $Tb$ higher than $Tr$. They take the spherical shape, and then, while travelling towards the upper part of the apparatus, they are rapidly cooled to a temperature $T\beta$, at which they are abruptly solidified; that is to say, phase "*c*."

It has been established that the velocity at which the granules are injected into the flame should be capable of being adjusted within narrow limits. For example, it is essential that, according to the composition of the glass which is used, this velocity should be more or less high in order to make allowance for the diameter and the density of the granules.

This adjustment is carried out by acting, for example, on the inlet pressure of the vehicle gas for combustion. In this manner, the granules are projected at a velocity which is the resultant of the air velocity and their own delivery velocity (function of the diameter and density). There is thus obtained the advantage of being able in all cases to adapt the propulsion velocity of the granules, by which it is possible to obtain the maximum output.

It is thus possible to fix the exact time during which the glass granules are subjected to the formation process (fusion and solidification) and to limit this time to the absolute minimum.

It has been found that the maximum output was obtained when steps were taken for avoiding the beads being left too long at a high temperature. In this manner, the adhesion of the beads to one another is avoided. At the outlet from this shaping zone, the beads travel through the cooling zone which is constituted in such manner as to obtain a sudden solidification (phase "*c*"), followed by a moderate cooling operation (phase "*d*"). Finally, during the last phase, when the setting up of stresses is no longer to be feared, the cooling is accelerated again (phase "*e*"). Since the speed of introduction and consequently the initial impulse is a function of the type of beads to be manufactured (diameter and density) and moreover, since the speed of ascent of the gases decreases as they become cooled, the velocity of the beads which are formed decreases and may fall below the velocity necessary for carrying them towards the upper end of the vertical column and towards the separator.

A series of vertical air jets is then arranged in the upper part of the apparatus so as to increase the speed of ascent. There is thus created an eddying which is favourable to the last part of the cooling of the beads, that is to say, below the temperature at which hardening is no longer possible.

It has been found that a certain proportion of the beads sometimes escapes being entrained by the hot gases and, on the other hand, it has been seen that it is desirable for the beads to be solidified as rapidly as possible. This is why a ring of nozzles through which cold air is blown is positioned around the burner and at a slightly higher level. The nozzles are vertical or inclined to the vertical, according to requirements. They are designed to take up the glass granules which could have left the central flame during the initial part of their ascent and dropped out of the effective zone of the said flame. In addition, the said nozzles contribute to the formation of a relatively cold gas current immediately after the beads are formed, the said current solidifying the beads so that they are not able to adhere to one another and in addition ensuring the complete entrainment of the products at a perfectly uniform velocity and temperature in each horizontal section of the apparatus.

The apparatus according to Figures 2 and 3 is composed essentially of a vertical column formed by a tubular column 1 of refractory material resting on a support 42 by means of a collar 41, and fixing means for absorbing the vibrations, for example, springs 40 or other equivalent devices. The tubular column 1 is enclosed by a cooling jacket 2 which is traversed by an air current blown by a constant delivery fan 7. Positioned at the base of the column 1 and axially of the latter is a burner 3 which receives fuel gas through a pipe line 4 connected to the supply source by a flexible tube 22 and a valve 34. Air is supplied to the burner 3 through a double pipe system 5, 35 which opens at 3 around the pipe line 4 and is concentric with the latter.

The air delivered by the fan 7 into the jacket 2 leaves the latter through a double pipe system 6, 6' connected to the double pipe system 35, 5 of the burner, the pipe line 6' taking the air from the jacket 2 at a place at which this air has still not been brought to the maximum possible temperature, while the pipe line 6 takes the air which has been pre-heated to the maximum value from the said jacket.

The pipes 6, 6' are fitted with valves 43, 45 and communicate with one another through a valve 44.

The fan 7 is operated by a motor 37 of adjustable speed in such manner as to be able to modify the delivery or output of the fan 7 according to working conditions.

Opening into the pipe 5 is a pipe 8 positioned at the outlet of a worm 9 controlled by a motor 36 and fed with previously crushed and calibrated glass granules which are introduced into a supply hopper 10. The said hopper, in conjunction with the worm, forms an airtight assembly in order to avoid any leakage of air from the piping system 2, 6 and 5.

Owing to the three valves 43, 44, and 45 it is possible to obtain several combinations:

By closing 44, it is possible to effect the entraining of the glass granules at a moderate temperature, that is to say, clearly below the softening point. The hotter air passing in 6 is then reserved for increasing the temperature of the flame.

By closing 45 and regulating the opening of 44 according to requirements, it is possible to use a larger or smaller part of the air which is heated to the maximum and which is coming from 6, for the purpose of conveying the glass granules.

By regulating the opening of the three valves, it is possible to achieve various combinations as a function of the temperatures to be achieved, the softening temperature of the glass, the delivery of the glass granules and all other possible operating conditions.

Provided around the burner 3 is a ring of nozzles 11 which is supplied with air through a pipe system 38 connected to a fan 39. A current of air is sent by this fan into the nozzles 11, it being possible for the velocity and temperature of this air to be regulated by suitable conventional means which are widely known. The nozzles 11 are secured to their supports 11' in such manner that they may be caused to change their inclination in relation to the axis of the apparatus.

At the upper end of the tubular column 1, an elbow 12 conducts the shaped beads towards a separator 13, from which the burnt gases leave by way of the opening 14, while the solid products are deposited in the lower part 15 provided with a box 16 for the collection of the said products.

The apparatus operates as follows:

The glass granules introduced at 10 are carried at a constant speed, determined by the worm 9 controlled by a variable speed motor 36, towards the pipe 8 and fall regularly through the latter into the air current which is circulating in the pipe 5, after having passed through the jacket 2 in which it is heated to a temperature between 400 and 1000° C., according to requirements.

The hot air entrains the glass granules in the pipe system 5 and gives up its heat to these granules throughout the travel towards the burner 3, where the said air immediately enters into combustion with the gases arriving from the pipe 4. The combustion is rapid and the flame acquires a very high temperature owing to the preheating of the air. This pre-heating has been controlled in such manner that the granules are preferably brought to a temperature slightly lower than or immediately before their softening point, which they reach at the instant at which they enter the flame.

While keeping constant the total delivery of air necessary for the combustion, it is possible by means of the valves 43, 44, 45 to regulate the air supply which entrains the granules leaving the pipe 8 and consequently to regulate separately the temperature of the flame and the velocity of the granules when they pass into the burner 3.

At this instant, the glass granules are projected upwardly by the air jet by which they are entrained; owing to this impulse, they are not able to fall on to the sides of the burner 3 and avoid the action of the latter. They will thus reach a zone in the apparatus at which, owing to the air injected through the nozzles 11, a uniform gas current exists throughout the cross-section of the apparatus, as has already been explained above.

In this manner, provided that the granules are projected with a velocity sufficient for reaching this height, they will be taken up in the homogenised vapour current and it will be ensured that all the granules will be carried upwardly; there is no longer any possibility of a certain proportion of them dropping down to the lower part of the column.

It has been found that it is desirable to be able to regulate the inclination of each of the nozzles 11 individually.

This operation is carried out by known means, for example, by separately mounting each nozzle 11 on a ball joint 11" with a possibility of securing it to conform to any direction of ascent.

By this means, the advantage is obtained of being able carefully to neutralise over the entire periphery the effect of expansion of the burner flame and of being able to obtain a current of hot gases which are as uniform as possible over the entire section of the tube 1.

The burner 3 is regulated in such a manner as to obtain a short and hot flame in such a manner that as soon as they are formed, the beads are cooled owing to the injection of air through the nozzles 11, and are solidified in the form of perfect spheres.

Owing to the possibility of regulating the velocity and temperature of the air issuing from the nozzles 11, it is possible to fix very accurately the optimum conditions for carrying out the process of fusion and solidification (phases $b$ and $c$).

The beads then pass through the zone of influence of the cooling jacket 2. In the upper part of the latter, the cooling is relatively moderate owing to the circulation of air blown in by the fan 7, this cooling being the zone "$d$" of the diagram.

In the upper part of the column 1, the beads, having reached a temperature at which it is no longer possible for tensions to be set up, are subjected to a more intensive cooling.

For this purpose, there is provided a fresh series of nozzles 18 fed through a casing 19 connected by a duct 20 to a fan 33. Jets of cold air directed tangentially in relation to the column 1 are blown through these nozzles 18 into the interior of the column 1 in order to create a turbulent motion. The beads are thus cooled intensely because of the jets of cold air and the tubulent motion. This is phase "$e$" of the diagram, on conclusion of which the beads are brought to a temperature in the region of 150–200° C.

During the phases "$d$" and "$e$," the beads coming into contact with the wall of the column 1 cooled by the circulation of air in jacket 2 and by the jets leaving the nozzles 18 would be able to remain adhering to the said wall if they have avoided the cooling action. The accumulation of said beads may cause a decrease in the cross-section of the apparatus.

In order to avoid this accumulation, the apparatus is subjected to vibrations which destroy or detach the agglomerated products as they are formed. These vibrations are generated by a vibrator 17 fixed to the wall of the tube 1 and operated constantly or at more or less close intervals, according to requirements.

It is for the purpose of permitting the column 1 to vibrate that the latter is mounted on its support 42 by means of springs 40 or other devices absorbing the vibrations, which are interposed between the said support and the collar 41 fixed to the tube 1.

The beads leaving the cooling zone of the jacket 2 are directed by an elbow 12 towards a separator 13.

In certain cases, for example, when handling less fusible glass, it has been found that it may be desirable to increase the radius of the flame. According to the invention, this is achieved by increasing its power of emission, for example, by adding products such as heavy hydrocarbons to the liquid fuel, the said products rendering the fuel illuminating.

It is also possible to proceed by increasing the turbulence of the flame at the immediate outlet of the burner, this being obtained by supplying the gas or air by a pulsating device, a piston compressor or other apparatus. Such a device has the additional advantage of being better able to hold the glass granules in suspension, this being important if the glass is dense and also if the spheres to be manufactured are relatively large.

As the pre-heating temperature of the granules is very close to or immediately precedes their softening temperature, experience has shown that a slight derangement of the control apparatus may give a temperature which is just too high, with which there is danger of the granules adhering to one another. In order to obviate this disadvantage, the invention provides the possibility of causing the air charged with glass granules to vibrate, this giving greater mobility to the said granules and reducing the danger of adhesion.

This result is obtained by connecting the last section of the pipe 5 to a vibrator 24 which is formed, for example, by a known device such as a diaphragm 24' actuated by an electromagnetic vibrator 46 so as to set up acoustic vibrations which are transmitted to the air and in turn cause the latter to vibrate.

The vibration set up either by 17 or 24 are prevented from extending to the complete installation by inserting flexible connections 22, 23, 23' and 25 in front of and following that part of the apparatus in which the beads are formed.

At their outlet from the column 1, the beads are directed towards a separator 13.

According to the invention, this separator may take different forms, depending on the manufacturing conditions, for example, according to whether products of greater or lesser degrees of fineness are treated or whether the supply of the glass granules is high or low.

The most simplest form will be that of a dust-separating cyclone, at the entrance to which the burnt gases are subjected to a loss of velocity which enables the beads to be deposited and fall into the lower part 15 constituting a box provided with a shut-off device 16 (a cap or the like) through which they are periodically discharged. The exhaust gases from which the beads are removed escape upwardly and discharge through the opening 14. The operation is carried out in such manner that their temperature on discharge is slightly higher than 100°. In this way, it is possible to avoid the water vapour which they contain being deposited on the beads and the latter are discharged in a perfectly dry state.

Under certain conditions the ordinary cyclone does not give an output of 100% and some of the smallest beads are entrained by the exhaust gases.

In order to obviate this disadvantage, there will be employed a separator of the type shown in Figure 4, namely:

The beads, after having been formed, pass into the flexible connection 25 and through an elbow 26, one branch of which opens vertically into a cyclone 47. When they leave this vertical branch, the hot gases charged with beads impinge against a baffle plate 27 which stops the beads and causes them to rebound along the paths directed downwardly, which causes them to fall towards the bottom of the apparatus where they are collected.

It has been found that the separation is improved if the exhaust gases leaving the vertical part of the elbow 26 are given a spinning motion. For this purpose, a screw 31 for producing a whirling motion is disposed in the outlet of the vertical branch of the elbow 26, which motion, because of centrifugal force, combined with the effect of the baffle plate 27, tends to displace the beads from the axis of the apparatus in proportion as they are heavier. There is thus obtained a grading of the beads by dimensions, since their weight is proportional to the diameter. Advantage is taken of this fact by providing an annular separating partition 28, the products falling inside and outside the said partition and thus being separately collected; the largest beads collect in the box 30 and the smallest beads in the box 29.

The present invention lends itself to numerous constructional modifications without thereby departing from the actual scope of the invention. For example, the limits of the pre-heating and of the possibilities of regulating the pre-heating of the glass granules before they are injected into the flame may be amplified by providing the apparatus as described above in connection with Figure 2 with an independent pre-heating means comprising, for example, a tube $a$ connected at one end to the lower part of the jacket 2 or directly to the fan 7 and, at the other end, by means of regulating valves $c$ and $d$, to the pipes 6' and 6 respectively, the tube $a$ being combined with a gas jet $b$ connected to a supply pipe by a flexible connection 22'. By using this independent pre-heating means $a$, $b$, $c$ and $d$ it is possible to intensify in an adjustable manner both the pre-heating of the air in the pipe 6' intended for pre-heating the glass granules, and also the pre-heating of the air introduced into the part 33 of the burner in order to leave the latter by the external concentric pipe, and suitably to regulate these two pre-heating intensifier systems in relation to one another.

I claim:

1. Apparatus for forming glass beads from crushed glass particles comprising a substantially vertical column, an upwardly directed burner positioned within the lower end of said column, a bead collecting member attached to the upper end of said column, a central fuel pipe within said burner, an air pipe concentrically surrounding said fuel pipe, a jacket surrounding said column intermediate the ends thereof, connecting means between said air pipe and said jacket, means for supplying fuel to said fuel pipe, means for supplying air under pressure to said air pipe and jacket, means for feeding said glass particles into said air pipe, and means including said jacket and said connecting means for preheating the air in said pipe to a temperature slightly above the softening point of said crushed glass particles, said glass particles being fed into said air pipe at a point spaced sufficiently before said burner for said glass particles to be heated to just below the softening point immediately prior to entry in said burner.

2. Apparatus as claimed in claim 1 wherein said air preheating means additionally includes independent means to heat said air and wherein said air supplying means includes an adjustable constant delivery pump.

3. Apparatus as claimed in claim 1 wherein said connecting means between said jacket and said pipes comprises two tubular elements that join said jacket at different temperature zones, said tubular elements being provided with separate regulating valves and an intercommunicating valve.

4. Apparatus as claimed in claim 1 additionally comprising a ring of upwardly directed nozzles extending around said burner below said jacket, and means for supplying air in variable quantities and at variable temperatures to said nozzles.

5. Apparatus as claimed in claim 4 additionally comprising a second ring of nozzles directed tangentially into said column at a point above said jacket.

6. Apparatus as claimed in claim 1 additionally comprising means to vibrate said air pipe in which said glass particles are fed.

7. Apparatus as claimed in claim 1 additionally comprising means to vibrate said column.

References Cited in the file of this patent

UNITED STATES PATENTS

| | | |
|---|---|---|
| 1,513,622 | Manning | Oct. 28, 1924 |
| 2,044,680 | Gilbert | June 16, 1936 |
| 2,421,092 | Neuschotz | June 10, 1947 |
| 2,572,484 | Howle et al. | Oct. 23, 1951 |
| 2,600,963 | Bland | June 17, 1952 |
| 2,619,776 | Potters | Dec. 2, 1952 |